United States Patent
Okada et al.

(10) Patent No.: US 6,968,260 B2
(45) Date of Patent: Nov. 22, 2005

(54) VEHICLE DRIVE CONTROL APPARATUS, VEHICLE DRIVE CONTROL METHOD AND PROGRAM THEREFOR

(75) Inventors: Rie Okada, Anjo (JP); Norio Tomiya, Anjo (JP); Kazuyuki Izawa, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 63 days.

(21) Appl. No.: 10/679,437

(22) Filed: Oct. 7, 2003

(65) Prior Publication Data

US 2004/0122563 A1   Jun. 24, 2004

(30) Foreign Application Priority Data

Dec. 19, 2002   (JP) .............................. 2002-367614

(51) Int. Cl.[7] ............................................ G05B 23/02
(52) U.S. Cl. ........................................ 701/35; 369/21
(58) Field of Search ...................... 701/29, 35; 369/21

(56) References Cited

U.S. PATENT DOCUMENTS

| | | | |
|---|---|---|---|
| 5,452,446 A | * | 9/1995 | Johnson ........................ 707/1 |
| RE35,920 E | * | 10/1998 | Sorden et al. .............. 342/457 |
| 6,356,824 B1 | * | 3/2002 | Chene et al. .................. 701/35 |
| 6,438,472 B1 | * | 8/2002 | Tano et al. .................... 701/35 |
| 6,546,363 B1 | * | 4/2003 | Hagenbuch .................... 703/7 |
| 6,745,151 B2 | * | 6/2004 | Marko et al. ............... 702/182 |
| 6,836,712 B2 | * | 12/2004 | Nishina ........................ 701/35 |
| 6,885,979 B2 | * | 4/2005 | Nishina et al. ............. 702/187 |

FOREIGN PATENT DOCUMENTS

| JP | 06-018293 | * 1/1994 |
|---|---|---|
| JP | A 2000-214922 | 8/2000 |

* cited by examiner

Primary Examiner—Michael J. Zanelli
(74) Attorney, Agent, or Firm—Oliff & Berridge, PLC

(57) ABSTRACT

A vehicle drive control apparatus includes buffers, as a recording portion, set for each of a plurality of storage items, each of the plurality of storage items having a different sampling cycle, and a controller that samples variable quantities, that indicate a status of a vehicle that changes with a running of the vehicle, at a sampling cycle set for each of the plurality of storage items and records the variable quantities in each of the buffers as storage data.

21 Claims, 9 Drawing Sheets

| | | | |
|---|---|---|---|
| a1 | a2 | a3 | a4 |
| a5 | a6 | a7 | a8 |
| a9 | a10 | a11 | a12 |
| a13 | a14 | a15 | → |
| | → | | → |
| | | | |
| | | | |
| | | | |
| | | | |
| b1 | b2 | b3 | b4 |
| b5 | b6 | b7 | → |
| | → | | → |
| | | | |
| c1 | c2 | c3 | c4 |
| c5 | → | | → |
| | | | |
| d1 | d2 | d3 | d4 |
| | → | | → |

FRAME F1 (rows 1–9), FRAME F2 (rows 10–13), FRAME F3 (rows 14–16), FRAME F4 (rows 17–18)

VEHICLE DRIVE CONTROL APPARATUS, VEHICLE DRIVE CONTROL METHOD AND PROGRAM THEREFOR

INCORPORATION BY REFERENCE

The disclosure of Japanese Patent Application No. 2002-367614 filed on Dec. 19, 2002 including the specification, drawings and abstract is incorporated herein by reference in its entirety.

BACKGROUND OF THE INVENTION

1. Field of Invention

The invention relates to a vehicle drive control apparatus, a vehicle drive control method and a program thereof.

2. Description of Related Art

Conventionally, a vehicle drive apparatus is loaded on a vehicle, for example, an electric vehicle. A drive motor, as an electric motor device, generates drive motor torque that is transmitted to drive wheels. The drive motor is powered (driven) by receiving direct current from a battery at the time of driving the wheels so as to generate the drive motor torque. During regeneration (generation), torque resulting from the inertia of the electric vehicle is received to generate a direct current and this generated direct current is supplied to the battery.

In another vehicle drive apparatus loaded on a hybrid vehicle, part of the engine torque is transmitted to a generator as a first electric motor device (generator motor). The other part of the engine torque is transmitted to the drive wheels by a vehicle drive apparatus. A planetary gear unit including a sun gear, a ring gear and a carrier is provided in this vehicle drive apparatus. The carrier is connected with the engine, the ring gear is connected with the drive wheel and the sun gear is connected with the generator. Thus, a rotation outputted from the ring gear and the drive motor, as the second electric motor device, is transmitted to the drive wheels in order to generate a driving force.

Further, in order to drive the vehicle drive apparatus, the hybrid vehicle (as an electric vehicle) includes a vehicle drive control unit with a vehicle control unit and a drive motor control unit, such that an entire control of the electric vehicle is carried out by the vehicle control unit while control of the drive motor is carried out by the drive motor control unit. In addition, the hybrid vehicle may also include a vehicle drive control unit with a vehicle control unit, a generator control unit and a drive motor control unit. As such, an entire control of the hybrid vehicle is carried out by the vehicle control unit, control of the generator is carried out by the generator control unit and control of the drive motor is carried out by the drive motor control unit.

If an abnormality occurs in the vehicle drive apparatus, for example, if a CPU of the vehicle drive control unit detects an abnormality, it determines the cause of the abnormality, namely, an abnormality occurrence reason, based on accumulated data. See, for example, Japanese Patent Laid-Open Publication 2000-214922.

SUMMARY OF THE INVENTION

As a result, regardless of the presence of an abnormality, data about predetermined storage items are recorded (accumulated) in a RAM ring buffer at a storage timing that is set for each predetermined sampling cycle. If an abnormality occurs, the data recorded in the ring buffer is recorded in an EEPROM and the reason for this abnormality occurrence is determined based on that data.

In the conventional vehicle drive control unit, although the sampling cycle differs depending on each storage item, frames for recording the storage data for all the storage items are formed. Thus, a region for recording the storage data is reserved in the frames, even though there is no need to record the storage data since certain timings do not accord with the storage timing. Thus, the recording capacity of the recording portion constituted by the ring buffer is expanded by that amount. Thus, the cost of the vehicle drive control unit is increased.

Further, because the ring buffer is provided in the same region as a region used for regular control processing of the RAM, the recording capacity of the region used for the regular control processing is decreased as the recording capacity of the ring buffer is increased.

The invention thus addresses the above-described problems of the conventional vehicle drive control apparatus. The invention thus provides a vehicle drive control apparatus, a vehicle drive control method and a program thereof, that allows a recording capacity of a recording portion for recording data, which is necessary for determining a cause of an abnormality that has occurred, to be reduced. Accordingly, the cost of the vehicle drive control apparatus can be reduced.

To achieve the foregoing, a vehicle drive control apparatus of a first exemplary aspect of the invention includes buffers, as a recording portion, set for each of a plurality of storage items, each of the plurality of storage items having a different sampling cycle, and a controller that samples variable quantities, that indicate a status of a vehicle that changes with a running of the vehicle, at a sampling cycle set for each of the plurality of storage items and records the variable quantities in each of the buffers as storage data.

According to a second exemplary aspect of the invention, a vehicle drive control method includes the steps of setting a buffer for each of a plurality of storage items, each of the plurality of storage items having a different sampling cycle, sampling variable quantities, that indicate a status of a vehicle that changes with a running of the vehicle, at a sampling cycle set for each of the plurality of storage items and recording the variable quantities in each of the buffers as storage data.

According to a third exemplary aspect of the present invention, a program for a vehicle drive control apparatus includes a routine that sets buffers for multiple storage items, each of the multiple storage items having a different sampling cycle, a routine that samples variable quantities, that indicate a status of a vehicle that changes with a running of the vehicle, at a sampling cycle set for each of the multiple storage items and a routine that records the variable quantities in each of the buffers as storage data.

As a result, a buffer is set for each storage item, storage data of each storage item is recorded in each of the buffers and a frame is formed for each storage item. Thus, even if the sampling cycle differs depending on each of the storage items, the recording capacity of the recording portion constituted by the buffers can be reduced. As a result, the cost of the vehicle drive control apparatus can be lowered.

Further, it is possible to reduce the recording capacity of the buffers. It is thus possible to increase the recording capacity of the region used for regular control processing by an equivalent amount.

In addition, a sufficient amount of the storage data can be recorded in the buffers in the recording portion having a predetermined recording capacity. Accordingly, if an abnormality occurs, the cause of that abnormality can be determined accurately.

BRIEF DESCRIPTION OF THE DRAWINGS

Various embodiments of the invention will be described with reference to the drawings, wherein.

DETAILED DESCRIPTION OF PREFERRED EMBODIMENTS

Hereinafter, the preferred embodiment of the invention will be described in detail with reference to the accompanying drawings. In this case, an example in which the invention is applied to a vehicle, for example, a hybrid vehicle as an electric vehicle, will be described.

Figure 1:
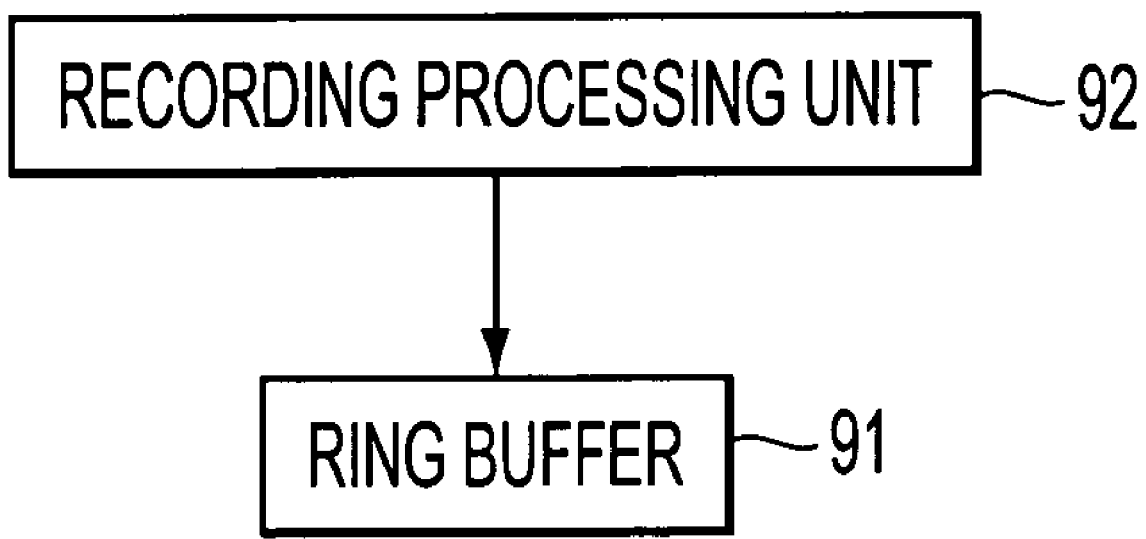
FIG. 1 is a functional block diagram of a vehicle drive control unit according to an embodiment of the invention.

FIG. 1 is a functional block diagram of a vehicle drive control unit according to the embodiment of the invention. In this figure, reference numeral 91 denotes a ring buffer, as a buffer, which is set for each of a plurality of multiple storage items having different sampling cycles and which constitutes a recording section. Reference numeral 92 denotes a recording processing unit which samples a change amount that changes along with the running of the vehicle, at a sampling cycle set for each of the storage items, and which records that change amount in each buffer as the storage data.

Figure 2:
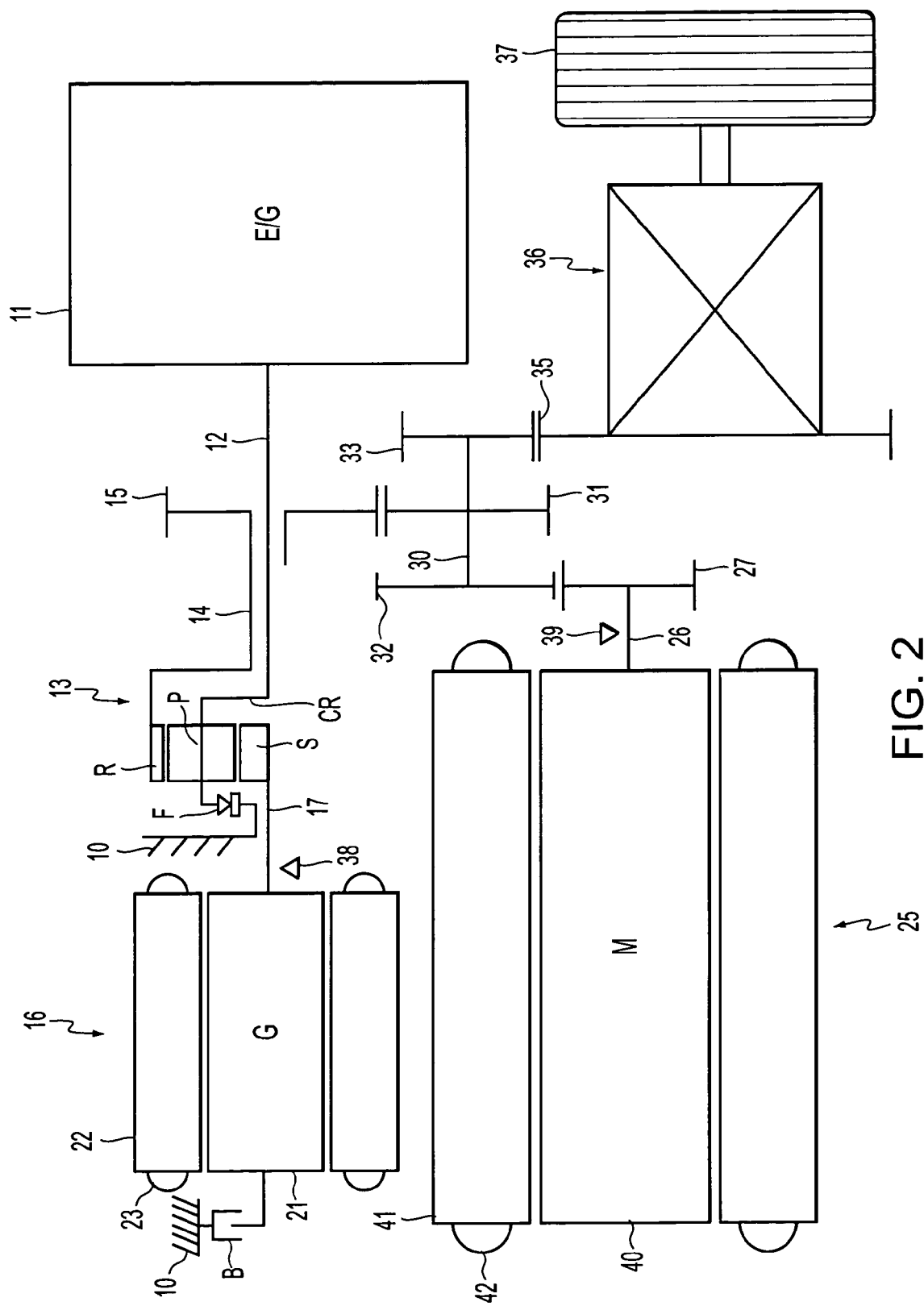
FIG. 2 is a conceptual diagram of a hybrid vehicle according to the embodiment of the invention.

FIG. 2 is a conceptual diagram of the hybrid vehicle according to the embodiment of the invention. Referring to the same Figure, reference numeral 11 denotes an engine (E/G) disposed on a first axial line, reference numeral 12 denotes an output shaft which is disposed on the first axial line and outputs a rotation generated by driving the engine 11, reference numeral 13 denotes a planetary gear unit, which is a differential gear unit disposed on the first axial line for changing the speed of the rotation inputted through the output shaft 12, reference numeral 14 denotes an output shaft which is disposed on the first axial line and which outputs the rotation after the speed is changed by the planetary gear unit 13, reference numeral 15 denotes a first counter drive gear which is an output gear fixed on the output shaft 14, and reference numeral 16 denotes a generator (G), which is a first motor device disposed on the first axial line, connected to the planetary gear unit 13 through a transmission shaft 17 and also mechanically connected to the engine 11 such that it is capable of free differential rotation. The output shaft 14 has a sleeve-like shape and is disposed so as to surround the output shaft 12. The first counter drive gear 15 is disposed on the side of the engine 11 with respect to the planetary gear unit 13.

The planetary gear unit 13 includes at least a sun gear S as a first gear element, a pinion P which meshes with the sun gear S, a ring gear R which is a second gear element meshing with the pinion P and a carrier CR which is a third gear element supporting the pinion P rotatably. The sun gear S is connected to the generator 16 through the transmission shaft 17. The ring gear R is disposed on a second axial line parallel to the first axial line and is connected mechanically to the engine 11 and the generator 16 through the output shaft 14 and a predetermined gear train such that it is capable of free differential rotation. Further, the ring gear R is connected to a drive motor (M) 25, as a second motor device, connected mechanically to a drive wheel 37. The carrier CR is connected to the engine 11 through the output shaft 12. A vehicle drive unit is comprised of the engine 11, the planetary gear unit 13, the generator 16, the drive motor 25, and other members.

A one-way clutch F is disposed between the carrier CR and a case 10 of the vehicle drive unit. This one-way clutch becomes free when a normal direction rotation is transmitted from the engine 11 to the carrier CR. When an opposite direction rotation is transmitted from the generator 16 or the drive motor 25 to the carrier CR, the one-way clutch F is locked, thereby preventing the opposite direction rotation from being transmitted to the engine 11.

The generator 16 is fixed to the transmission shaft 17 and comprises a rotor 21 disposed rotatably, a stator 22 disposed around the rotor 21, and a coil 23 wound on the stator 22. The generator 16 generates electric power by rotation transmitted through the, transmission shaft 17. The coil 23 is connected to a battery (not shown), and supplies DC current to the battery. A generator brake B is disposed between the rotor 21 and the case 10B. By applying the generator brake B, the rotor 21 is held so as to mechanically stop the rotation of the generator 16.

Moreover, reference numeral 26 denotes an output shaft which is disposed on the second axial line and which outputs a rotation of the drive motor 25, and reference numeral 27 denotes a second counter drive gear as an output gear which is fixed to the output shaft 26. The drive motor 25 includes a rotor 40 which is fixed to the output shaft 26 and which is disposed rotatably, a stator 41 disposed around the rotor 40, and a coil 42 wound on the stator 41. The drive motor 25 generates a drive motor torque TM with U-phrase, V-phase and W-phase currents which are alternating currents supplied to the coil 42. Accordingly, the coil 42 is connected to the battery, so that DC current from the battery is converted to respective-phase currents and supplied to the coil 42.

To rotate the drive wheel 37 in the same direction as the rotation of the engine 11, a counter shaft 30 is disposed on a third axial line in parallel to the first and second axial lines. A first counter driven gear 31 and a second counter driven gear 32 having more teeth than the first counter driven gear 31 are fixed on the counter shaft 30. The first counter driven gear 31 meshes with the first counter drive gear 15 while the second counter driven gear 32 meshes with the second counter drive gear 27, so that the rotation of the first counter drive gear 15 is reversed and transmitted to the first counter driven gear 31 and the rotation of the second counter drive gear 27 is reversed and transmitted to the second counter driven gear 32.

A differential pinion 33 having fewer teeth than the first counter driven gear 31 is fixed on the counter shaft 30. A differential unit 36 is disposed on a fourth axial line in parallel to the first to third axial lines, and a differential ring gear 35 of the differential unit 36 meshes with the differential pinion gear 33. Thus, rotation transmitted to the differential ring gear 35 is distributed by the differential unit 36 and transmitted to the drive wheel 37. As described above, it is possible for not only rotation generated by the engine 11 to be transmitted to the first counter driven gear 31, but also for rotation generated by the drive motor 25 to be transmitted to the second counter driven gear 32. Consequently, by driving the engine 11 and the drive motor 25, the hybrid vehicle can run.

In addition, reference numeral 38 denotes a generator rotor position sensor for detecting the position of the rotor 21, that is, a generator rotor position θG, like a resolver. Reference numeral 39 denotes a drive motor rotor position sensor for detecting the position of the rotor 40, that is, a drive motor rotor position θM, like a resolver. The detected generator rotor position θG is sent to a vehicle control unit and a generator control unit (not shown) and the drive motor rotor position θM is sent to the vehicle control unit and a drive motor control unit (not shown).

In the planetary gear unit 13, the carrier CR is linked with the engine 11, the sun gear S is linked with the generator 16 and the ring gear R is linked with the drive motor 25 and the drive wheel 37 through the output shaft 14. Consequently, the rotation speed of the ring gear R, that is, a ring gear rotation speed NR is equal to a rotation speed outputted to the output shaft 14, that is, an output shaft rotation speed NE. The rotation speed of the sun gear S is equal to a rotation speed of the generator 16, that is, a generator rotation speed NG. Accordingly, if the number of teeth of the ring gear R is made ρ times (twice in this embodiment) that of the sun gear S, a relation (ρ+1)·NE=1·NG+ρ·NR is established. Therefore, an engine rotation speed NE can be calculated based on the ring gear rotation speed NR and the generator rotation speed NG:

$$NE=(1\cdot NG+\rho\cdot NR)/(\rho+1) \quad (1)$$

Moreover, a rotation speed relation equation of the planetary gear unit 13 is established based upon equation (1).

An engine torque TE; a torque generated in the ring gear R, namely, a ring gear torque TR; and a torque of the generator 16, namely, a generator torque TG, as an motor device torque, have the following relationship:

$$TE:TR:TG=(\rho+1):\rho:1 \quad (2)$$

These respective torques subject each other to mutual reaction forces. A torque relation equation of the planetary gear unit 13 is established based upon equation (2).

Figure 3:
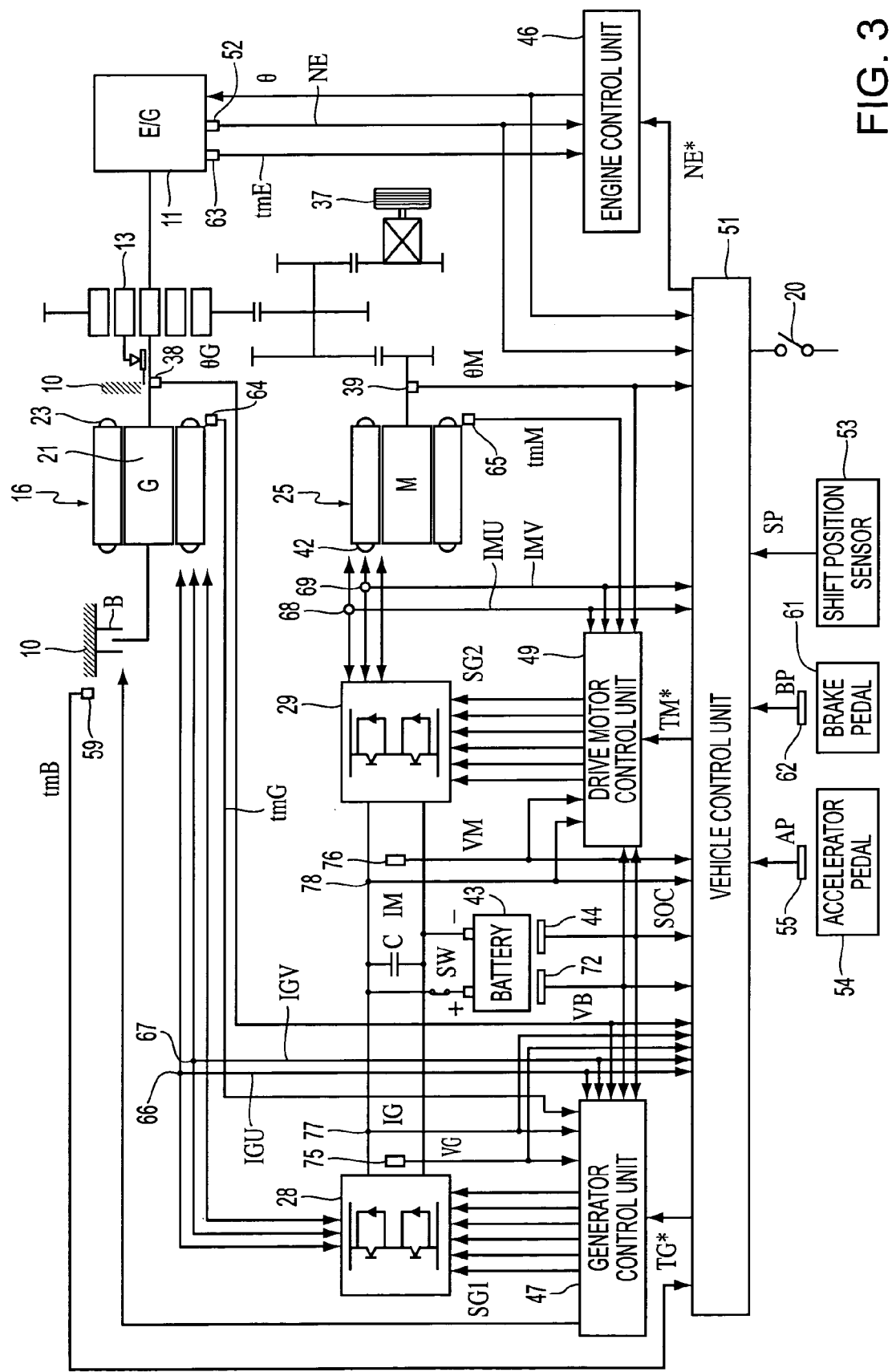
FIG. 3 is a conceptual diagram of the vehicle drive control unit according to the embodiment of the invention.

Next, the vehicle drive control unit for driving the hybrid vehicle having the above-described structure will be described. FIG. 3 is a conceptual diagram of the vehicle drive control unit of the embodiment of the invention. Referring to the same Figure, the reference numeral 10 denotes the case, the reference numeral 11 denotes the engine (E/G), the reference numeral 13 denotes the planetary gear unit, the reference numeral 16 denotes the generator (G), the reference symbol B denotes the generator brake for fixing the rotor 21 of the generator 16, the reference numeral 25 denotes the drive motor (M), reference numeral 28 denotes an inverter as a generator inverter for driving the generator 16, reference numeral 29 denotes an inverter as a drive motor inverter for driving the drive motor 25, the reference numeral 37 denotes the drive wheel, the reference numeral 38 denotes the generator rotor position sensor, the reference numeral 39 denotes the drive motor rotor position sensor, and reference numeral 43 denotes a battery. The inverters 28 and 29 are connected to the battery 43 through a power supply switch SW and the battery 43 supplies a direct current to the inverters 28 and 29 when the power supply switch SW is ON.

A generator inverter voltage sensor 75 as a first DC voltage detecting portion for detecting a voltage of the direct current applied to the inverter 28, namely, a generator inverter voltage VG; and a generator inverter current sensor 77 as a first direct current detecting portion for detecting a direct current supplied to the inverter 28, namely, a generator inverter current IG, are provided at an input side of the inverter 28. Further, a drive motor inverter voltage sensor 78 as a second DC voltage detecting portion for detecting a DC voltage applied to the inverter 29, namely, a drive motor inverter voltage VM, is provided at an intake of the inverter 29. Further, the generator inverter voltage VG and generator inverter current IG are sent to the generator control unit 47 and the vehicle control unit 51, and the drive motor inverter voltage VM and drive motor inverter current IM are sent to the drive motor control unit 49 and the vehicle control unit 51. A smoothing capacitor C is connected between the battery 43 and the inverters 28 and 29, and a power switch SW is disposed between a positive polarity terminal of the battery 43 and the inverters 28 and 29, so that the drive of the vehicle drive unit can be started or stopped when a vehicle driver as an operator turns the power switch SW to ON or OFF.

Moreover, the vehicle control unit 51 includes a CPU (not shown), a recording unit, and the like, and functions as a computer based on various kinds of programs, data, and the like, so as to control the entire vehicle drive unit. The vehicle control unit 51 is connected to the engine control unit 46, the generator control unit 47 and the drive motor control unit 49. In addition, the engine control unit 46 includes a CPU (not shown), a recording unit, and the like, and sends instruction signals such as a throttle opening degree θ, a valve timing, and the like, to the engine 11 so as to control the engine 11. Further, the generator control unit 47 comprises a CPU (not shown), a recording unit, and the like, and sends a drive signal SG1 to the inverter 28 so as to control the generator 16. Moreover, the drive motor control unit 49 comprises a CPU (not shown), a recording unit, and the like, and sends a drive signal SG2 to the inverter 29 so as to control the drive motor 25. A first control unit, that has a lower level than the vehicle control unit 51, is constituted by the engine control unit 46, the generator control unit 47 and the drive motor control unit 49. A second control unit, that has a higher level than the engine control unit 46, the generator control unit 47 and the drive motor control unit 49 is constituted by the vehicle control unit 51. In addition, the engine control unit 46, the generator control unit 47 and the drive motor control unit 49 also function as a computer based on various kinds of programs, data and the like.

The inverter 28 is driven in accordance with the drive signal SG1 from the generator control unit 47, and receives the direct current from the battery 43 during times of running. Accordingly, respective phase currents, IGU, IGV, IGW are generated. The respective phase currents IGU, IGV, IGW are supplied to the generator 16 and at the time of power regeneration, the respective phase currents IGU, IGV, IGW are received from the generator 16 so as to generate a direct current and supply it to the battery 43.

The inverter 29 is driven in accordance with the drive signal SG2 from the drive motor control unit 49, and receives a direct current from the battery 43 during times of running. Accordingly, respective phase currents, IMU, IMV, IMW are generated. The respective phase currents IMU, IMV, IMW are supplied to the drive motor 25, and at the time of power regeneration, the respective phase currents IMU, IMV, IMW are received from the drive motor 25 so as to generate a direct current and supply it to the battery 43.

Reference numeral 20 denotes an ignition switch which is switched to ON or OFF by the vehicle driver in order to start or terminate the operation of the hybrid vehicle; reference numeral 44 denotes a battery remaining charge detecting unit for detecting the state of the battery 43, namely, the remaining SOC of the battery, as the battery state. Reference numeral 52 denotes an engine rotation speed sensor as an engine rotation speed detecting portion for detecting an engine rotation speed NE; reference numeral 53 denotes a shift position sensor, as a selected speed operation unit, for detecting a position of a shift lever (not shown) namely, a shift position SP. Reference numeral 54 denotes an accelerator pedal and reference numeral 55 denotes an accelerator switch as an accelerator operation detecting portion for detecting a position (depression amount) of the accelerator pedal 54, namely, an accelerator pedal position AP. Reference numeral 59 denotes an oil temperature sensor as an oil temperature detecting portion for detecting the temperature of oil in the hydraulic servo of the generator brake B, namely, an oil temperature tmB. Reference numeral 61 denotes a brake pedal and reference numeral 62 denotes a brake switch as a brake operation detecting portion for detecting the position (depression amount) of the brake pedal 61, namely, a brake pedal position BP. Reference numeral 63 denotes an engine temperature sensor for detecting the temperature tmE. Reference numeral 64 denotes a generator temperature sensor as a first temperature detecting portion for detecting the temperature of the generator 16, namely, a temperature tmG of the coil 23. Reference numeral 65 denotes a drive motor temperature sensor as a second temperature detecting portion for detecting the temperature of the drive motor 25, for example, a temperature tmM of the coil 42.

Reference numerals 66 to 69 denote current sensors as alternate current detecting portions for detecting the respective phase currents IGU, IGV, IMU, IMV. Reference numeral 72 denotes a battery voltage sensor, as a voltage detection portion for the battery 43, that detects a battery voltage VB as the battery state. The battery voltage VB and the remaining SOC of the battery are sent to the generator control unit 47, the drive motor control unit 49 and the vehicle control unit 51. In addition, as the battery state, the battery current, the battery temperature, or the like, can be detected. Further, a battery state detecting portion is constituted by the battery remaining charge detecting unit 44, the battery voltage sensor 72, a battery current sensor (not shown), a battery temperature sensor (not shown), and the like. The detected currents IGU and IGV are sent to the generator control unit 47 and the vehicle control unit 51. The detected currents IMW and IMV are sent to the drive motor control unit 49 and the vehicle control unit 51.

The vehicle control unit 51 sends an engine control signal to the engine control unit 46, and sets a drive and a stop of the engine 11. A vehicle speed computing unit (not shown) of the vehicle control unit 51 executes vehicle speed computing processing, and computes a change ratio $\Delta\theta M$ of the drive motor rotor position $\theta M$, and computes a vehicle speed V based on the change ratio $\Delta\theta M$ and a gear ratio $\gamma V$ of the torque transmission system from the output shaft 26 (FIG. 2) to the drive wheel 37.

The vehicle control unit 51 determines an engine target rotation speed NE* expressing a target value of the engine rotation speed NE, a generator target torque TG* expressing a target value of the generator torque TG and a drive motor target torque TM* expressing a target value of the drive motor torque TM. The generator control unit 47 sets a generator target rotation speed NG* expressing a target value of the generator rotation speed NG and the drive motor control unit 49 sets a drive motor torque correction value $\delta TM$ expressing a correction value of the drive motor torque TM. Note that a control command value is constituted by the engine target rotation speed NE*, the generator target torque TG*, the drive motor target torque TM* and the like.

A generator rotation speed computing processing unit (not shown) as the generator control unit 47 executes generator rotation speed computing processing and reads the generator rotor position $\theta G$. By computing the change ratio $\Delta\theta G$ of the generator rotor position $\theta G$, the rotation speed of the generator 16, namely, the generator rotation speed NG is computed. In addition, a drive motor velocity computing processing unit (not shown) as the drive motor control unit 49 executes drive motor rotation speed computing processing and reads the drive motor rotor position $\theta M$. By computing a change ratio $\Delta\theta M$ of the drive motor rotor position $\theta M$, the rotation speed of the drive motor 25, namely, a drive motor rotation speed NM is computed.

Because the generator rotor position $\theta G$ and the generator rotation speed NG are proportional to each other and the drive motor rotor position $\theta M$, the drive motor rotation speed NM and the vehicle speed V are proportional to each other, the generator rotor position sensor 38 and the generator rotation speed computing processing unit can be made to function as a generator rotation speed detecting portion for detecting the generator rotation speed NG. Further, the drive motor rotor position sensor 39 and the drive motor rotation speed computing processing unit can be made to function as a drive motor rotation speed detecting portion for detecting the drive motor rotation speed NM. Moreover, the drive motor rotor position sensor 39 and the vehicle speed computing processing unit can be made to function as a vehicle speed detecting portion for detecting the vehicle speed V.

According to this embodiment, the engine rotation speed NE is detected by the engine rotation speed sensor 52. However, the engine rotation speed NE can be computed by the engine control unit 46. Although, according to this embodiment, the vehicle speed V is computed based on the drive motor rotor position $\theta M$ by the vehicle speed computing processing unit, the vehicle speed V may be computed based on the ring gear rotation speed NR by detecting the ring gear rotation speed NR, or based on the rotation speed of the drive wheel 37, that is, the drive wheel rotation speed. In this case, as the vehicle speed detecting portion, a ring gear rotation speed sensor, a drive wheel rotation speed sensor, and the like, are provided. For example, any of the following are variable quantities indicating the state of the vehicle: output values from the drive motor rotor position sensor 39, the brake switch 62, the battery voltage sensor 72, the engine rotation speed sensor 52, the generator inverter voltage sensor 75, the drive motor inverter voltage sensor 76, the generator inverter current sensor 77, the drive motor inverter current sensor 78, and the like. In addition, command values to various kinds of control targets such as the throttle opening degree θ, and engine target rotation speed NE* and sensor values indicating respective control states of various kinds of control targets such as the temperatures of the inverters 28 and 29 can be used to indicate the state of the vehicle. Output values from vehicle sensors other than those described above are also included in the variable quantity indicating the state of the vehicle.

It should be noted that if an abnormality occurs in the vehicle drive unit, the cause of the abnormality can be determined if various kinds of data are obtained from when the abnormality occurred. Accordingly, when an abnormality occurs, predetermined data is obtained by a predetermined control unit being one of the engine control unit 46, the generator control unit 47, the drive motor control unit 49 and the vehicle control unit 51. In this embodiment, the drive motor control unit 49 obtains the predetermined data when an abnormality occurs, and this data is recorded as storage data. Although, according to this embodiment, the storage data is acquired by the drive motor control unit 49, the storage data may be acquired by the engine control unit 46, the generator control unit 47, the vehicle control unit 51, or the like. Moreover, the storage data may be acquired and recorded by two or more control units among the drive motor control unit 49, the engine control unit 46, the generator control unit 47, the vehicle control unit 51, and the like.

Figure 4:
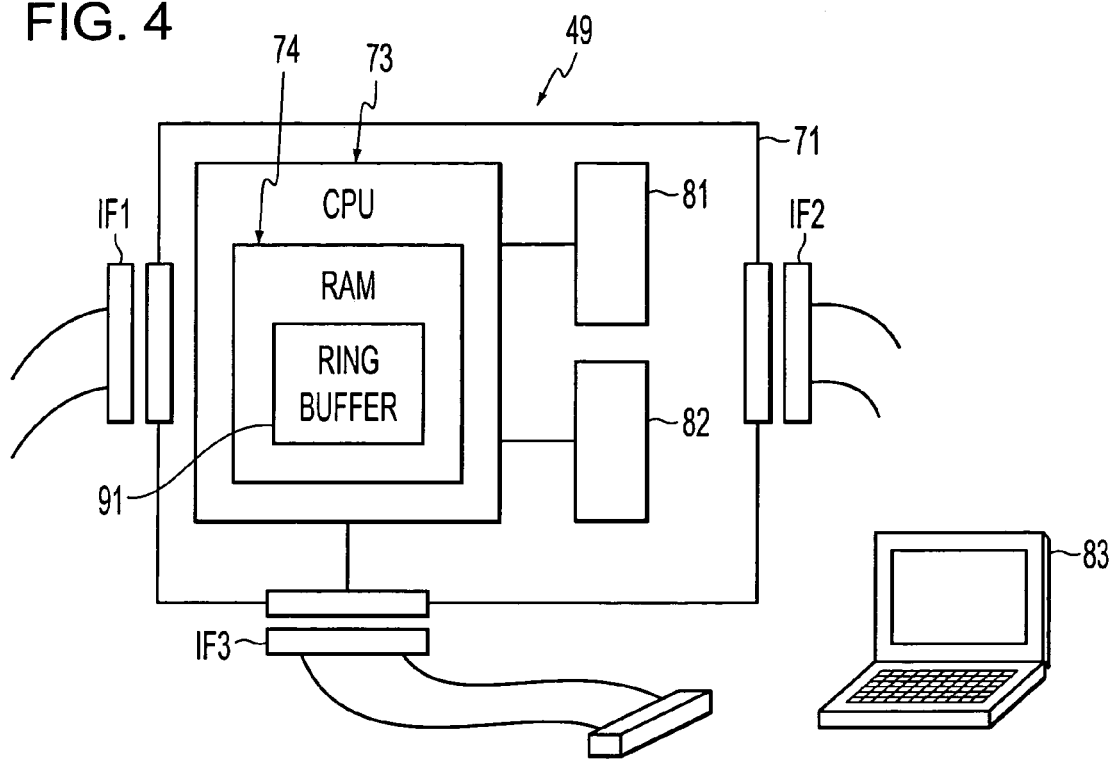
FIG. 4 is a conceptual diagram showing an arrangement of a drive motor control unit according to the embodiment of the invention.

Next, the drive motor control unit 49 for obtaining and recording the storage data will be described. FIG. 4 is a conceptual diagram showing an arrangement of the drive motor control unit according to the embodiment of the invention. Referring to the same Figure, the reference numeral 49 denotes the drive motor control unit, reference numeral 71 denotes a substrate, reference numeral 73 denotes a CPU mounted on the substrate 71, reference numeral 74 denotes a RAM as a first recording portion incorporated in the CPU 73, and a ring buffer 91 is set in the RAM 74. Reference numeral 81 denotes a recording EEPROM as a second recording portion constituted by a nonvolatile memory. Reference numeral 82 denotes a diagnostic EEPROM as a third recording portion constituted by a nonvolatile memory. Reference symbols IF1 to IF3 denote an interface. Both of the EEPROMs 81 and 82 are mounted on the substrate 71, and are connected to the CPU 73. The storage data acquired by the CPU 73 is recorded in the EEPROM 81.

Other memories such as ROM (not shown) are mounted on the substrate 71 as a recording portion and connected to the CPU 73. Note that the recording unit is constituted by the EEPROMs 81 and 82, the ROM and the like. Although, according to this embodiment, the RAM 74 is incorporated in the CPU 73, the RAM 74 may be disposed separately from the CPU 73.

Reference numeral 83 denotes a personal computer which is connected selectively to the drive motor control unit 49 and which sets the storage items of the storage data; reads out data from the EEPROMs 81 and 82; and executes data processing with a data processing unit (not shown) based on the read out data, so as to determine the cause of the abnormality. This personal computer functions as a computer based on various kinds of programs, data and the like.

Figure 5:
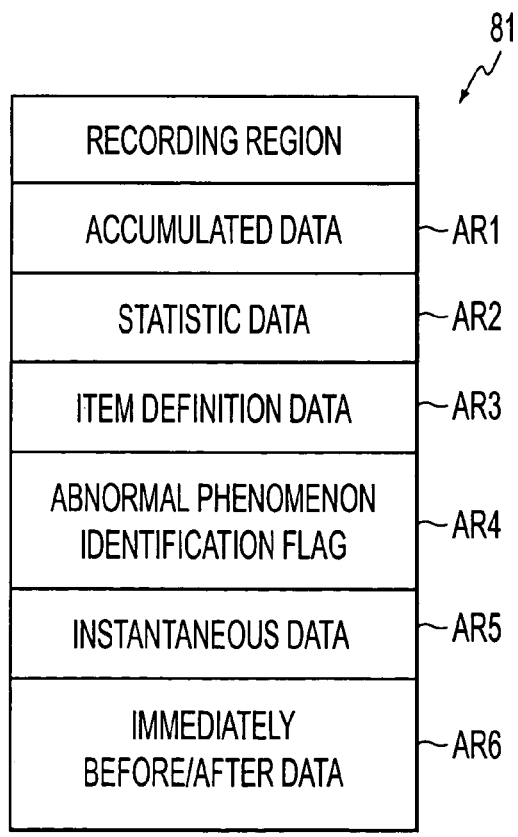
FIG. 5 is a diagram showing a recording region of EEPROM according to the embodiment of the invention.

Next, respective recording regions formed in the EEPROM 81, and the storage data which is recorded in the respective recording regions will be described. FIG. 5 is a diagram showing the recording region of the EEPROM according to the embodiment of the invention. The storage data is classified into first and second types.

The storage data belonging to the first type is data recorded regardless of the occurrence of an abnormality. For example, the first type includes accumulated data which is accumulated and recorded throughout the time when the hybrid vehicle is running, statistic data which is recorded as a result of statistic processing executed throughout the time when the hybrid vehicle is running, and the like.

The storage data belonging to the second type is data which is recorded when an abnormality occurs. The second type includes instantaneous data which is read and acquired at a time at which an abnormality occurs, immediately before/after data which is read and acquired immediately before and immediately after the abnormality occurs, and the like.

In addition, the recording region of the EEPROM 81 is divided into regions AR1 to AR8. The accumulated data is recorded in the region AR1. The statistic data is recorded in the region AR2. The item definition data which defines and expresses the storage item of the instantaneous data and the immediately before/after data is recorded in the region AR3. The details of an abnormality that has occurred, that is, an abnormal phenomenon identification flag indicating the abnormal phenomenon, is recorded in the region AR4. The instantaneous data is recorded in the region AR5 and the immediately before/after data is recorded in the region AR6.

The storage items of the instantaneous data and the immediately before/after data are selected preliminarily from a software definition table recorded in the ROM by operating the personal computer 83 (FIG. 4). The storage items are then defined as item definition data, and then set. This item definition data may be changed by operating the personal computer 83 as required. When an abnormality occurs, the abnormal phenomenon identification flag is recorded in the region AR4 in correspondence with the instantaneous data recorded in the region AR5 and the immediately before/after data recorded in the region AR6.

It should be noted that the storage items of the accumulated data include a running distance of the hybrid vehicle following a start of the hybrid vehicle after shipping; a running time of the hybrid vehicle, a reset frequency indicating the number of resets of the CPU 73 (FIG. 4) executed due to the occurrence of abnormalities following shipment, and the like. In addition, when the hybrid vehicle is started after the ignition switch 20 (FIG. 3) is turned to ON, all the accumulated data recorded in the region AR1 is read out from the EEPROM 81, loaded in the RAM 74 (FIG. 4), and accumulated and updated along with operation of the hybrid vehicle. If the power switch SW is turned to OFF before the ignition switch 20 is turned to OFF, data is recorded in the region AR1 again.

The storage items of the statistic data include a maximum torque indicating a maximum value of the drive motor torque TM, a minimum torque indicating a minimum value of the drive motor torque TM, a maximum rotation speed indicating a maximum value of the drive motor rotation speed NM, and the like. Furthermore, if the operation of the hybrid vehicle is started after the ignition switch 20 is turned ON, all the statistic data recorded in the region AR2 is read out from the EEPROM 81, loaded in the RAM 74, and compared with an actual measured value (for example, the drive motor torque TM of any cycle, the drive motor rotation speed NM, and the like) detected for each storage item along with a drive of the vehicle drive unit. If there is just one storage item that establishes an updating condition, the statistic data of that storage item is updated, and overwritten and recorded on the region AR2.

The instantaneous data includes data common to each abnormal phenomenon (hereinafter referred to as "common data") and data inherent to a specific abnormal phenomenon (hereinafter referred to as "characteristic data"). The common data is recorded regardless of the abnormal phenomenon, and the characteristic data is selected in correspondence with the abnormal phenomenon and then recorded. Therefore, the characteristic data is recorded in correspondence with the abnormal phenomenon identification flag.

The storage items of the common data include, for example, the temperature of the inverter 29 (FIG. 3), the drive motor torque TM, the generator torque TG, the drive motor rotation speed NM, the generator rotation speed NG, and the like. The storage items of the characteristic data include, for example as information corresponding to an over-heat abnormality of the coil 23 (FIG. 3), a vehicle required torque necessary for running the hybrid vehicle, the drive motor target torque TM*, a post-restriction drive motor target torque TM* after restriction, and temperature tmM of the coil 42 (FIG. 3), and the like. The post-restriction drive motor target torque TM* is the drive motor target torque TM* which has been restricted due to the oil temperature, the drive motor rotation speed NM, or the like, reaching their respective upper limit values.

Note that the ratio between the common data and characteristic data, the quantity of the storage items, and the like, are set in the item definition data and can be changed by operating the personal computer 83. Important storage data such as the accumulated data and the statistic data can be maintained by duplicating or mirroring within the same chip or another chip.

When an abnormality occurs, the instantaneous data is read at the timing at which the abnormality occurs and recorded in the region AR5 of the EEPROM 81. Contrary to this, the immediately before/after data is comprised of storage data read immediately before the timing at which the abnormality occurs and storage data read just after the abnormality occurs; the respective storage data is recorded in the region AR6 of the EEPROM 81. Note that the storage data read immediately before the timing at which the abnormality occurs may be storage data read within a predetermined time before the timing at which the abnormality occurs, or may be storage data sampled at a predetermined time before the timing at which the abnormality occurs. Likewise, the storage data read just after the timing at which the abnormality occurs may be storage data read within a predetermined time after the timing at which the abnormality occurs, or may be storage data sampled at a predetermined time after the timing at which the abnormality occurs.

Thus, the ring buffer 91 (FIGS. 1 and 4), as a buffer within the RAM 74, is set for each storage item; the variable quantities indicating the state of the vehicle that change with a running of the vehicle, or, for example, a variable quantity indicating a state of the vehicle drive unit that changes along with driving of the vehicle drive unit are constantly sampled for each storage item and recorded in the ring buffer 91 as storage data. In this case, the storage data is repeatedly overwritten and recorded on the ring buffer 91 from the head address up to the end address.

Figures 6, 7:
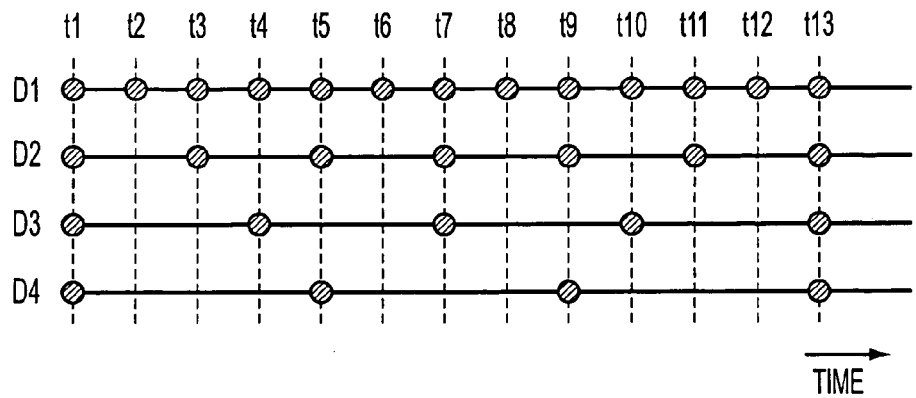
FIG. 6 is a diagram showing a storage timing of storage data according to the embodiment of the invention.
FIG. 7 is a diagram showing a recording state of the storage data according to the embodiment of the invention.
Figure 8:
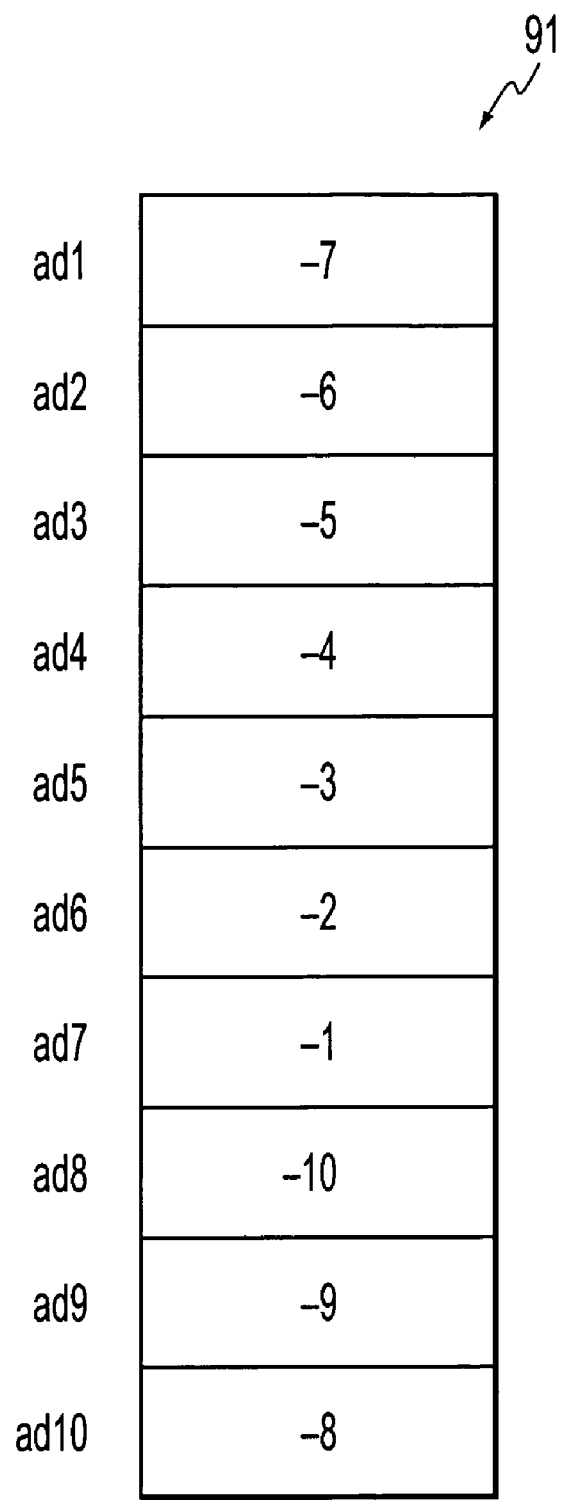
FIG. 8 is a diagram showing an example of a ring buffer according to the embodiment of the invention.

Next, a method for recording the sampled variable quantities in the ring buffer 91 as the storage data will be described. FIG. 6 is a diagram showing a storage timing of the storage data according to the embodiment of the invention; FIG. 7 is a diagram showing the recording state of the storage data according to the embodiment of the invention; and FIG. 8 is a diagram showing an example of the ring buffer according to the embodiment of the invention.

Each variable quantity of the vehicle drive unit is sampled at a predetermined sampling cycle set for each storage item based on the control cycle in the CPU 73 (FIG. 4). For example, as shown in FIG. 6, storage data D1 is recorded in the ring buffer 91 at storage timing t1 to t13, storage data D2 is recorded at storage timing t1, t3, t5, t7, t9, t11 and t13, storage data D3 is recorded at storage timing t1, t4, t7, t10 and t13 and the storage data D4 is recorded at storage timing t1, t5, t9 and t13.

For each storage item, that is, for each of the storage data D1 to D4, the ring buffer 91 is set and the respective storage data D1 to D4 are recorded in a frame formed in the ring buffer 91. For example, in FIG. 7, frames f1 to f4 are formed in each ring buffer 91. The frame f1 is formed by a sampling value ai (i=1, 2, . . . ) in the storage data D1. The frame f2 is formed by a sampling value bi (i=1, 2, . . . ) in the storage data D2. The frame f3 is formed by a sampling value ci (i=1, 2, . . . ) in the storage data D3. The frame f4 is formed by a sampling value di (i=1, 2, . . . ) in the storage data D4.

Thus, in each frame f1 to f4, the sampling value is written successively from the head address, and if the end address is reached, the sampling value is written from the head address again (overwritten) and recorded. Note that writing of the sampling value from the head address up to the end address is repeated.

For example, in an example of the ring buffer 91 shown in FIG. 8, of 10 addresses ad1 to ad10, the address ad1 serves as the head address while the address ad10 serves as the end address. Each sampling value is recorded in one of the respective addresses ad1 to ad10. In this case, the sampling value expressed by "−1" is the newest; the sampling value is older as the negative value increases from "−2", "−3", etc. The sampling value expressed by "−10" is the oldest.

A time for which the sampling is continued, that is, a sampling continue time, and each sampling interval, namely, sampling definition data comprised of samplings can be set or changed by operating the personal computer 83 (FIG. 4). According to this embodiment, the storage items of the storage data recorded in the ring buffer 91 are the same as the storage items of the instantaneous data. However, the storage items and the quantity of the storage items can be changed in accordance with the capacity of the RAM 74, the capacity of the EEPROM 81, and the like. Although, according to this embodiment, the ring buffer 91 is used as a buffer, it is possible to employ, instead of the ring buffer 91, a recording region, a recording apparatus, and the like, that are capable of recording the variable quantity in time series.

Figure 9:
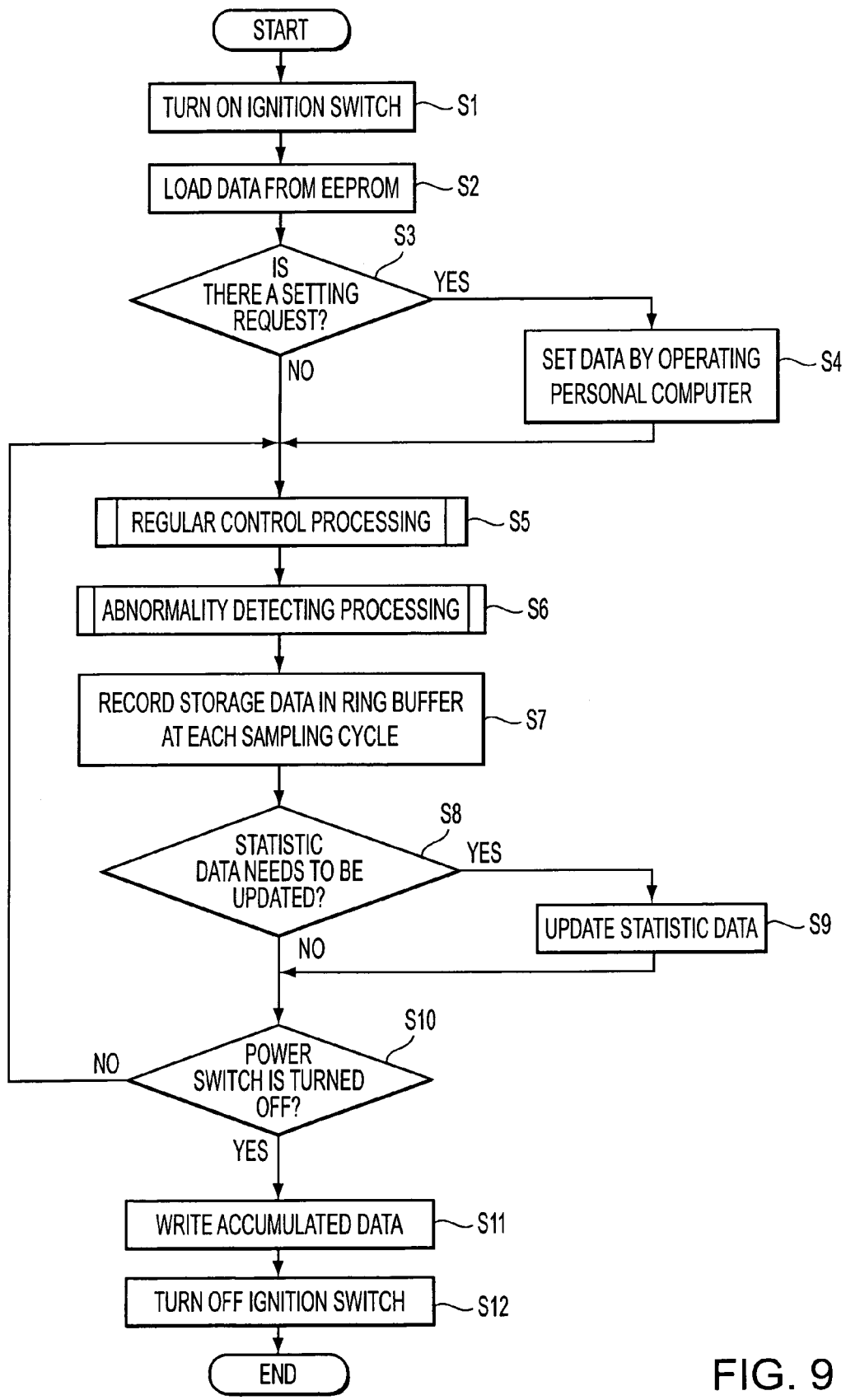
FIG. 9 is a main flow chart showing an operation of the vehicle drive control unit according to the embodiment of the invention.
Figure 10:
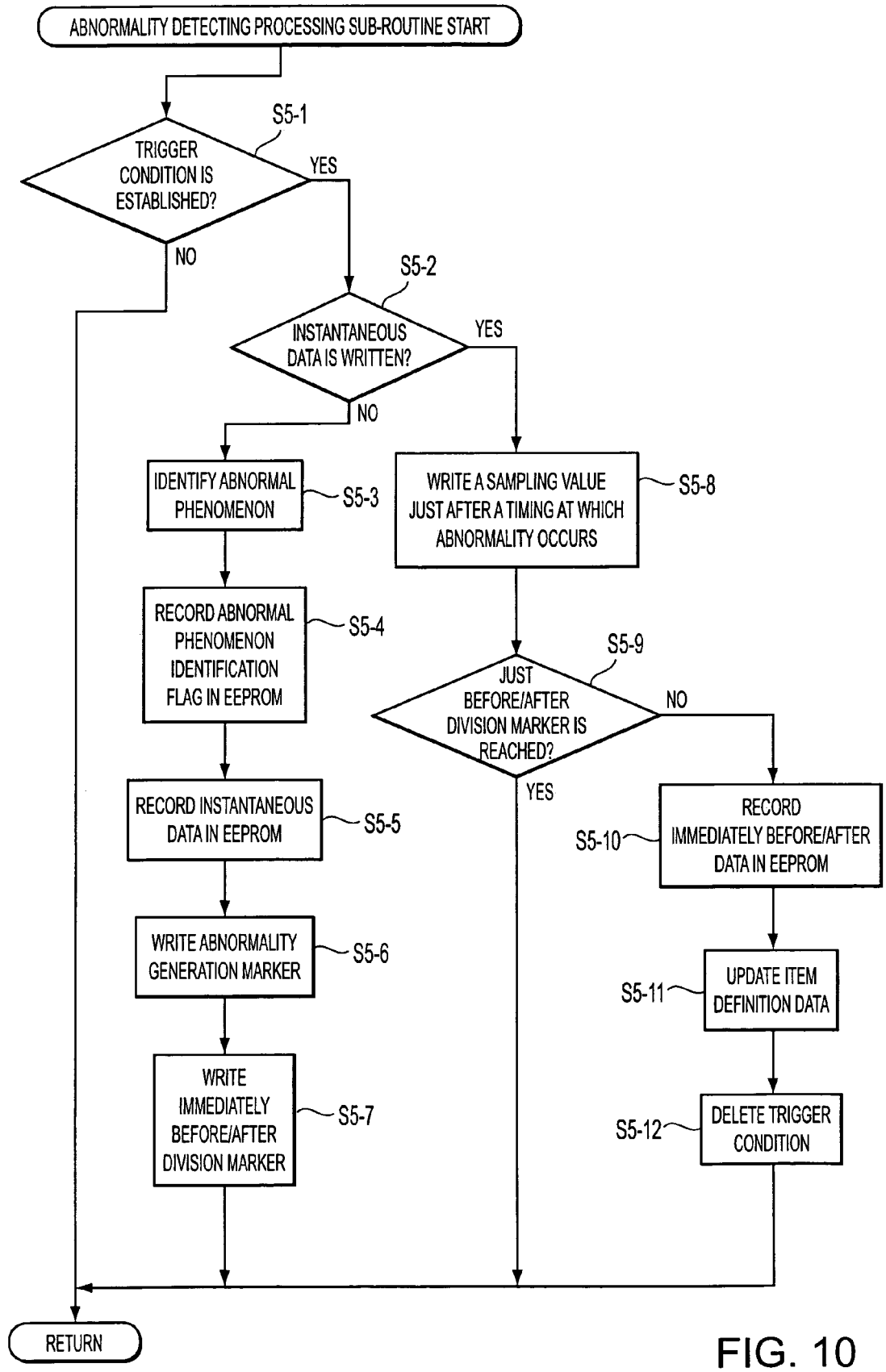
FIG. 10 is a diagram showing a sub-routine for abnormality detection processing according to the embodiment of the invention.
Figure 11:
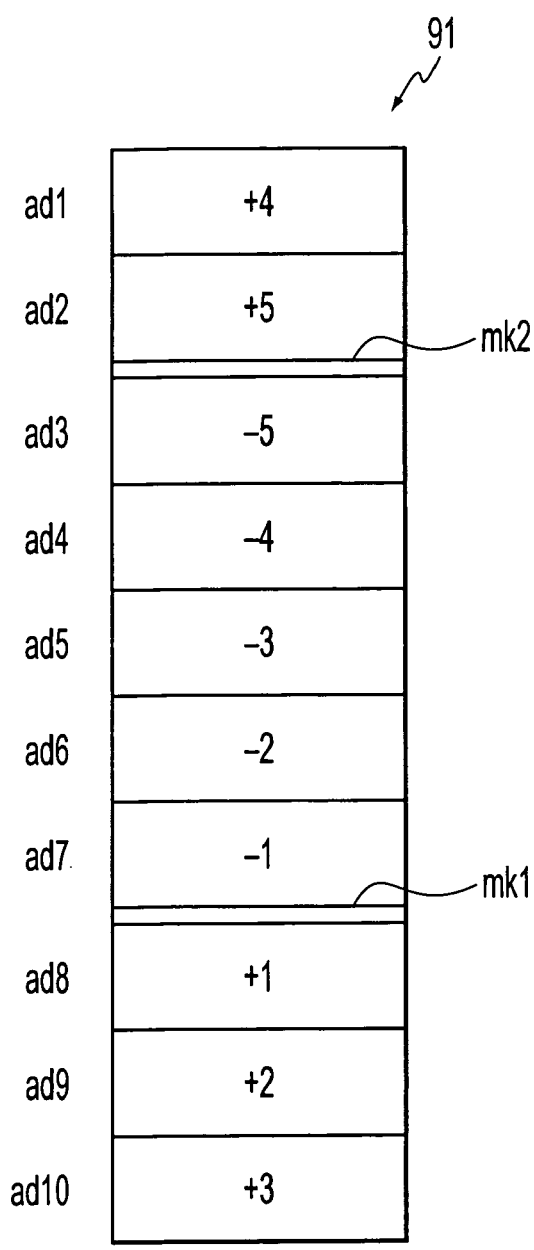
FIG. 11 is a diagram showing the state of the ring buffer when an abnormality occurs according to the embodiment of the invention.
Figure 12:
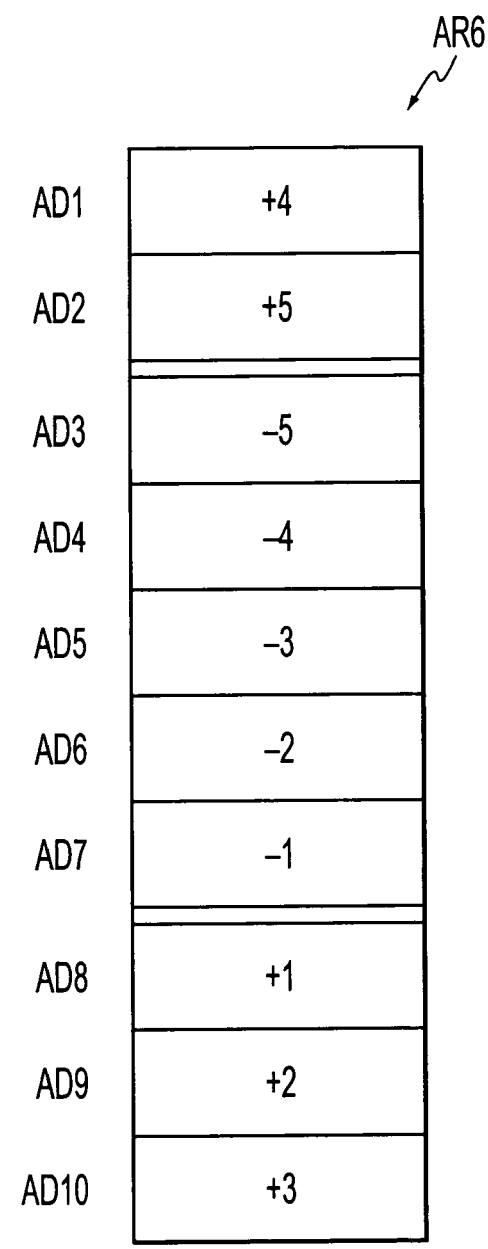
FIG. 12 is a diagram showing the state of the EEPROM when an abnormality occurs according to the embodiment of the invention.

Next, the operation of the vehicle drive control unit for controlling the vehicle drive unit having the above-described structure will be described. FIG. 9 is a main flow chart showing the operation of the vehicle drive control unit according to the embodiment of the invention. FIG. 10 is a diagram showing a sub-routine of abnormality detection processing according to the embodiment of the invention. FIG. 11 is a diagram showing the state of the ring buffer when an abnormality occurs in the embodiment of the invention. FIG. 12 is a diagram showing the state of the EEPROM when an abnormality occurs in the embodiment of the invention.

First, if the vehicle driver turns the ignition switch 20 to ON, a reading processing unit (not shown) in the CPU 73 carries out reading processing so as to read each of the accumulated data, the statistic data and the item definition data, and loads them in the RAM 74. Subsequently, a data setting processing unit (not shown) in the CPU 73 executes data setting processing by determining whether a setting request has been received from outside, and if there is such a setting request, setting or changing data such as the item definition data and the sampling setting data. In this case, the setting and changing of the storage item are carried out in accordance with the capacity of the RAM 74, the capacity of the EEPROM 81, and the like.

Then, a regular control processing unit (not shown) in the CPU 73 executes regular control processing so as to drive the vehicle drive unit to run the hybrid vehicle. Next, an abnormality detection processing unit (not shown) in the CPU 73 carries out the abnormality detection processing so as to determine whether any abnormality has occurred in the vehicle drive unit. If any abnormality has occurred, the storage data is recorded in the EEPROM 81. That is, the abnormality detection processing unit records the instantaneous data in the region AR5 and the immediately before/after data in the region AR6.

Next, a first recording processing unit (not shown) in the CPU 73 executes a first recording processing, in which the variable quantity of the vehicle drive unit is sampled for a predetermined storage item at each sampling cycle. This is recorded as storage data in the ring buffer 91 at the storage timing. The first recording processing unit repeats writing of the sampling value from the head address to the end address. In the meantime, the recording processing unit 92 (FIG. 1) is constituted from the first recording processing unit.

Next, a comparison processing unit (not shown) in the CPU 73 executes comparison processing, in which the variable quantity of the vehicle drive unit is sampled for the statistic data at a predetermined sampling cycle. The measured value is read and compared with the statistic data recorded in the RAM 74 so as to execute statistic processing. In this statistic processing, it is determined whether the statistic data needs to be updated.

A data updating processing unit (not shown) in the CPU 73 executes data updating processing, in which each measured value is compared with the statistic data (for example, the drive motor torque TM is compared with the maximum torque and the minimum torque, or the drive motor rotation speed NM is compared with the maximum rotation speed).

Further, if it is necessary to update the statistic data for the predetermined storage item, the date updating processing unit updates the statistic data for the storage item, and records it in the region AR2 by overwriting. In addition, the data updating processing unit reads the accumulated data and if the power switch SW is turned to OFF before the ignition switch 20 is turned to OFF, the accumulated data is recorded in the region AR1. In this way, the ring buffer 91 is set for each storage item, the storage data is recorded in each section of the ring buffer 91 for each storage item, and the frame is formed for each storage item. Thus, even if the sampling cycle is different depending on the storage item, the recording capacity of the recording portion constituted by the ring buffer 91 can be reduced. As a result, the cost of the vehicle drive control unit can be reduced.

Further, because a sufficient amount of the storage data can be recorded in the ring buffer 91 in the RAM 74 having a predetermined recording capacity, if an abnormality occurs, the cause of that abnormality can be determined accurately. The cause of an abnormality can be determined based on the instantaneous data and the immediately before/after data, that is, the state of the vehicle drive unit at the timing at which the abnormality occurs and the state of the vehicle drive unit immediately before and after the timing at which the abnormality occurs. Therefore, the cause of the abnormality can be determined more accurately.

Next, the flow chart of FIG. 9 will be described. In step S1, the ignition switch 20 is turned to ON, and in step S2, the data is loaded from the EEPROM 81. In step S3, a determination is made as to whether a setting request has occurred. If such a setting request exists, the routine proceeds to step S4 where the data is set by operating the personal computer 83. Otherwise, the operation proceeds to step S5.

In step S5, regular control processing is executed, in step S6, abnormality detection processing is executed, and in step S7, the storage data is recorded in the ring buffer 91 at each sampling cycle. In step S8, a determination is made as to whether the statistic data needs to be updated. If the statistic data needs to be updated, the processing proceeds to step S9. Otherwise, the operation proceeds to step S10.

In step S10, a determination is made as to whether the power switch SW is turned to OFF. If the power switch SW is turned to OFF, the processing proceeds to step S11. Otherwise, the operation returns to step S5. In step S11, the accumulated data is written, and in step S12, the ignition switch 20 is turned to OFF to end the processing.

Next, the sub-routine for the abnormality detection processing in step S6 of FIG. 9 will be described. In the regular control processing, if a value detected by the various kinds of sensors, that is, a detection value, or in this embodiment, the battery voltage VB detected by the battery voltage sensor 72, drops so as to go out of a reference range, an error flag is set. However, in the case of an abnormality that can be recovered easily after it has occurred, for example, a drop in the battery voltage VB, the abnormality generation cause does not need to be determined and the storage data does not need to be recorded.

Then, a recording condition establishment determining processing unit (not shown) of the abnormality detecting processing unit executes recording condition establishment determining processing so as to set up a trigger condition as a recording condition for recording the storage data regardless of whether the error flag is set. It is determined whether the abnormality that has occurred is one that later requires its generation cause to be determined, based on whether the trigger condition is established. Thus, for each storage data indicating each detection value, a threshold value for determining whether the trigger condition is established is set. If each storage data exceeds the threshold value, it is determined that the trigger condition is established and that an abnormality has occurred. Unless each storage data exceeds the threshold value, it is determined that the trigger condition is not established and that no abnormality has occurred. As described later, the storage data or the variable quantity is not recorded in the EEPROM 81.

According to this embodiment, it is determined that the trigger condition is established when the error flag is set and the storage data exceeds the threshold value. However, it can be determined that the trigger condition is established if the error flag is set.

Subsequently, if it is determined that an abnormality has occurred, an instantaneous data attaining processing unit (not shown) of the abnormality detecting processing unit executes instantaneous data attaining processing, attains the instantaneous data at the moment when each storage data exceeds its threshold value as the instantaneous data, and records it in the EEPROM 81. Thus, the instantaneous data attaining processing unit determines whether writing has been completed, depending on whether the instantaneous data is recorded in the EEPROM 81. If the instantaneous data has not yet been written into the EEPROM 81, the abnormal phenomenon indicated by the instantaneous data is identified, and the abnormal phenomenon identification flag and the instantaneous data indicating the identified abnormal phenomenon are recorded in the regions AR4 and AR5 of the EEPROM 81.

Next, an identifier writing processing unit (not shown) of the abnormality detecting processing unit executes identifier writing processing so as to write an abnormality occurrence marker mk1 as a first identifier indicating the timing at which the abnormality occurred as shown in FIG. 11. The abnormality occurrence marker mk1 is written between an address ad7 in which the newest sampling value is written in the ring buffer 91 shown in FIG. 8 and an address ad8 in which the oldest sampling value is written, that is, at a position that records the storage data at the timing at which the abnormality occurs. The identifier writing processing unit writes an immediately before/after division marker mk2 as a second identifier, which divides the sampling value immediately before the abnormality occurs from the sampling value just after, in the ring buffer 91. The immediately before/after division marker mk2 is written in a predetermined address interval set in advance. In the case of this embodiment, it is written between the addresses ad2 and ad3 in which an intermediate sampling value between the newest sampling value and the oldest sampling value is written, that is, the immediately before/after division marker mk2 is written at a position backward by half the storage capacity from the position at which the abnormality generation marker mk1.

According to this embodiment, the immediately before/after division marker mk2 is written at the position backward by half the storage capacity from the position at which the abnormality generation marker mk1 is written. However, the immediately before/after division marker mk2 may be written at a position backward by the amount of the sampling value before the abnormality occurred whose maintenance is required.

Subsequently, a just after data attaining processing unit (not shown) of the abnormality detecting processing unit executes just after data attaining processing so as to store data in the ring buffer 91 just after a timing at which the abnormality occurs. Thus, the just after data attaining processing unit records the sampling values successively from the address ad8 up to the address ad2 where the immediately before/after division marker mk2 is reached. In this case, a sampling value expressed by "+1" is a first storage data just after the abnormality occurs and this storage data becomes newer as the positive value increases in the manner "+2", "+3" etc. A sampling value expressed by "+5" is the newest. Note that the sampling value may be recorded up to a predetermined address immediately before the address ad2 where the immediately before/after division marker mk2 is reached. In this case, a just after setting marker mk2 is written into the ring buffer 91 as a third identifier corresponding to the predetermined address.

If the storage data immediately before and after the abnormality occurs are recorded in the ring buffer 91 as the immediately before/after data, a second recording processing unit (not shown) of the abnormality detecting processing unit executes recording processing so as to record the immediately before/after data recorded in the ring buffer 91 in the region AR6 of the EEPROM 81. For this reason, 10 addresses AD1 to AD10 are set in the region AR6, for example, as shown in FIG. 12, and the address AD1 of those addresses AD1 to AD10 is regarded as the head address while the address AD10 is regarded as the end address.

Then, the second recording processing unit records the immediately before/after data in the respective addresses AD1 to AD10.

Because the ring buffer 91 has the same data size as the region AR6, the immediately before/after data is read out in order from the data recorded in the head address ad1, and written in order from the head address AD1.

Note that immediately before/after data expressed by "−1" is the newest among the immediately before storage data, and becomes older as its negative value increases in the manner "−2", "−3" etc. Further, storage data expressed by "−5" is the oldest. Immediately before/after data expressed by "+1" is the first data of the just after storage data, and becomes newer as its positive value increases in the manner "+2", "+3" etc. Storage data expressed by "+5" is the newest.

If the immediately before/after data is recorded in the EEPROM 81 in this way, the abnormality detecting processing unit changes the item definition data if there is a storage item which should be changed because an abnormality has occurred, and then deletes the trigger condition.

Note that, according to this embodiment, the immediately before/after data is comprised of the storage data which is read immediately before the timing at which an abnormality occurs, and which is recorded in the ring buffer 91 and the storage data which is read just after the timing at which the abnormality occurs and which is recorded in the ring buffer 91. Although the respective storage data is recorded in the EEPROM 81, they may be recorded successively in the EEPROM 81 without recording the variable quantity that is read just after the timing at which the abnormality occurs in the ring buffer 91. This storage data may also be either one of the storage data which is read immediately before the timing at which the abnormality occurs and which is recorded in the ring buffer 91, and the storage data which is read just after the timing at which the abnormality occurs and which is recorded in the ring buffer 91.

According to this embodiment, the instantaneous data and the immediately before/after data are recorded in the EEPROM 81 when it is determined that an abnormality has occurred based on the predetermined trigger condition. Here, it is possible to set a first trigger condition for recording the instantaneous data in the EEPROM 81 and a second trigger condition for recording the immediately before/after data in the EEPROM 81 such that the trigger conditions are different. In this case, it is possible to make the storage data different from each other or their threshold values different, for each of the first and the second trigger conditions.

Next, the flow chart of FIG. 10 will be described. In step S5-1, a determination is made as to whether the trigger condition is established. If the trigger condition is established, the processing proceeds to step S5-2. Otherwise, the processing returns.

In step S5-2, a determination is made as to whether the instantaneous data has been written yet. If the instantaneous data has been already written, the processing proceeds to step S5-8. Otherwise, the processing proceeds to step S5-3. In step S5-3, the abnormal phenomenon is identified, in step S5-4, the abnormal phenomenon identification flag is recorded in the EEPROM 81, in step S5-5, the instantaneous data flag is recorded in the EEPROM 81, in step S5-6, the abnormal generation marker mk1 is recorded, and in step S5-7, the immediately before/after division marker mk2 is written and return is executed.

In step S5-8, the sampling value just after the timing at which an abnormality occurs is written. In step S5-9, a determination is made as to whether the immediately before/after division marker mk2 has been reached. If the immediately before/after division marker mk2 has been reached, return is executed. Otherwise, the processing proceeds to step S5-10.

In step S5-10, the immediately before/after data is recorded in the EEPROM 81, in step S5-11, the item definition data is changed, and in step S5-12, the trigger condition is deleted and return is executed.

It should be noted that the invention is not restricted to the above-described embodiment and may be modified in various ways in accordance with the conception of the present invention. Such modifications are in no way excluded from the scope of the invention.

What is claimed is:

1. A vehicle drive control apparatus, comprising:
   buffers, as a recording portion, set for each of a plurality of storage items, each of the plurality of storage items having a different sampling cycle; and
   a controller that:
      samples variable quantities, that indicate a status of a vehicle that changes with a running of the vehicle, at different sampling cycles for each of the plurality of storage items; and
      records the variable quantities successively in each of the buffers as storage data for each of the different sampling cycles.

2. The vehicle drive control apparatus according to claim 1, wherein the controller records the storage data recorded in each of the buffers in a second recording portion.

3. The vehicle drive control apparatus according to claim 2, wherein the controller determines whether a recording condition for recording in the second recording portion is established based on the variable quantities and, if the recording condition is established, attains instantaneous data at a timing at which the recording condition is established and records the instantaneous data in the second recording portion.

4. The vehicle drive control apparatus according to claim 3, wherein the controller determines whether the recording condition is provided for recording in the second recording portion based on the variable quantities and, if the recording condition is established, records storage data before a timing at which the recording condition is established and records storage data after the timing at which the recording condition is established, or at least one of the variable quantities, in the second recording portion.

5. The vehicle drive control apparatus according to claim 4, wherein the controller, after a predetermined time elapses following the timing at which the recording condition is established, records the storage data before the timing and the storage data after the timing, or at least any one of the variable quantities, in the second recording portion.

6. The vehicle drive control apparatus according to claim 5, wherein the buffers are formed from a ring buffer and the storage data is overwritten repeatedly from a head address to an end address in the ring buffer so as to be recorded therein.

7. The vehicle drive control apparatus according to claim 4, wherein the controller, up until a predetermined time elapses following the timing at which the recording condition is established, successively records the storage data before the timing in the second recording portion and records the variable quantity after the timing in the second recording portion.

8. The vehicle drive control apparatus according to claim 7, wherein the buffers are formed from a ring buffer and the storage data is overwritten repeatedly from a head address to an end address in the ring buffer so as to be recorded therein.

9. The vehicle drive control apparatus according to claim 2, wherein the controller determines whether a recording condition is provided for recording in the second recording portion based on the variable quantities and, if the recording condition is established, records storage data before a timing at which the recording condition is established and storage data after the timing at which the recording condition is established, or at least one of the variable quantities, in the second recording portion.

10. The vehicle drive control apparatus according to claim 9, wherein the controller, after a predetermined time elapses following the timing at which the recording condition is established, records the storage data before the timing and the storage data after the timing, or at least any one of the variable quantities, in the second recording portion.

11. The vehicle drive control apparatus according to claim 10, wherein the buffers are formed from a ring buffer and the storage data is overwritten repeatedly from a head address to an end address in the ring buffer so as to be recorded therein.

12. The vehicle drive control apparatus according to claim 9, wherein the controller, up until a predetermined time elapses following the timing at which the recording condition is established, successively records the storage data before the timing in the second recording portion and records the variable quantity after the timing in the second recording portion.

13. The vehicle drive control apparatus according to claim 12, wherein the buffers are formed from a ring buffer and the storage data is overwritten repeatedly from a head address to an end address in the ring buffer so as to be recorded therein.

14. The vehicle drive control apparatus according to claim 2, wherein item definition data about the storage items of the storage data to be recorded in the buffers is recorded in the second recording portion.

15. The vehicle drive control apparatus according to claim 14, wherein
   the buffers are formed from a ring buffer and the storage data is overwritten repeatedly from a head address to an end address in the ring buffer so as to be recorded therein.

16. The vehicle drive control apparatus according to claim 2, wherein an abnormal phenomenon identification flag for identifying an abnormal phenomenon is recorded in the second recording portion.

17. The vehicle drive control apparatus according to claim 16, wherein
   the buffers are formed from a ring buffer and the storage data is overwritten repeatedly from a head address to an end address in the ring buffer so as to be recorded therein.

18. The vehicle drive control apparatus according to claim 1, wherein the buffers are formed from a ring buffer and the storage data is overwritten repeatedly from a head address to an end address in the ring buffer so as to be recorded therein.

19. A vehicle drive control method, comprising:
   setting a buffer for each of a plurality of storage items, each of the plurality of storage items having a different sampling cycle;
   sampling variable quantities, that indicate a status of a vehicle that changes with a running of the vehicle, at different sampling cycles for each of the plurality of storage items; and
   recording the variable quantities successively in each of the buffers as storage data for each of the different sampling cycles.

20. A computer readable memory medium for a vehicle drive control apparatus, the memory medium storing a program comprising:
- instructions to set buffers for multiple storage items, each of the multiple storage items having a different sampling cycle;
- instructions to sample variable quantities, that indicate a status of a vehicle that changes with a running of the vehicle, at different sampling cycles for each of the multiple storage items; and
- instructions to record the variable quantities successively in each of the buffers as storage data for each of the different sampling cycles.

21. A vehicle drive control apparatus, comprising:
- means for recording a plurality of storage items, each of the plurality of storage items having a different sampling cycle;
- means for sampling variable quantities, that indicate a status of a vehicle that changes with a running of the vehicle, at different sampling cycles for each of the plurality of storage items; and
- means for recording the variable quantities successively as storage data for each of the different sampling cycles.

* * * * *